United States Patent
Hayes et al.

(10) Patent No.: US 10,232,549 B2
(45) Date of Patent: Mar. 19, 2019

(54) GEOMETRIC SOUND ABSORPTION VIA ADDITIVE MANUFACTURING

(71) Applicant: The Boeing Company, Chicago, IL (US)

(72) Inventors: Michael William Hayes, Belleville, IL (US); Nathanial C. Cuddy, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 635 days.

(21) Appl. No.: 14/850,952

(22) Filed: Sep. 10, 2015

(65) Prior Publication Data

US 2017/0072638 A1    Mar. 16, 2017

(51) Int. Cl.
| | |
|---|---|
| *B33Y 50/00* | (2015.01) |
| *B29C 64/106* | (2017.01) |
| *B64C 1/06* | (2006.01) |
| *B64C 1/40* | (2006.01) |
| *G10K 11/16* | (2006.01) |
| *B29C 64/386* | (2017.01) |

(Continued)

(52) U.S. Cl.
CPC .......... *B29C 64/106* (2017.08); *B29C 64/386* (2017.08); *B33Y 50/00* (2014.12); *B64C 1/066* (2013.01); *B64C 1/40* (2013.01); *G10K 11/16* (2013.01); *B29K 2101/12* (2013.01); *B29K 2105/0058* (2013.01); *B29L 2007/002* (2013.01); *B29L 2009/00* (2013.01); *B29L 2031/3076* (2013.01); *B33Y 10/00* (2014.12); *B33Y 50/02* (2014.12)

(58) Field of Classification Search
CPC ...... B33Y 10/00; B29C 64/386; B29C 64/118
See application file for complete search history.

(56) References Cited

U.S. PATENT DOCUMENTS

| | | | |
|---|---|---|---|
| 4,265,955 A | 5/1981 | Harp et al. | |
| 2012/0241993 A1* | 9/2012 | Lipton | A47J 43/25 |
| | | | 264/50 |

(Continued)

FOREIGN PATENT DOCUMENTS

| | | |
|---|---|---|
| CN | 104376190 A | 2/2015 |
| CN | 104732967 A | 6/2015 |

(Continued)

OTHER PUBLICATIONS

European Patent Office, Extended European Search Report regarding European Patent Application No. 16184219.0, dated Jan. 13, 2017, 11 pages.

(Continued)

*Primary Examiner* — Christina A Johnson
*Assistant Examiner* — Xue H Liu
(74) *Attorney, Agent, or Firm* — Kolisch Hartwell, P.C.

(57) ABSTRACT

Sound damping structures and methods for additively manufacturing composite structures having sound damping properties. In some embodiments, sound damping structures may be manufactured according to methods that may include selecting a desired sound damping geometry, inputting a three-dimensional computer-aided design model of the geometry into an additive manufacturing machine, and additively manufacturing a three-dimensional sound damping structure corresponding to the computer-aided design model.

20 Claims, 8 Drawing Sheets

(51) Int. Cl.
*B33Y 10/00* (2015.01)
*B33Y 50/02* (2015.01)
*B29K 101/12* (2006.01)
*B29K 105/00* (2006.01)
*B29L 7/00* (2006.01)
*B29L 9/00* (2006.01)
*B29L 31/30* (2006.01)

(56) References Cited

U.S. PATENT DOCUMENTS

| | | | |
|---|---|---|---|
| 2013/0116997 A1* | 5/2013 | Sun | G06F 17/5018 703/9 |
| 2014/0027199 A1 | 1/2014 | Claeys et al. | |
| 2015/0030434 A1 | 1/2015 | Stanka et al. | |

FOREIGN PATENT DOCUMENTS

| | | |
|---|---|---|
| WO | 9933641 A1 | 7/1999 |
| WO | 2015006479 A1 | 1/2015 |

OTHER PUBLICATIONS

Frits van der Eerden, Sound Absorption and Reflection with Coupled Tubes, 3rd B2000 Workshop at the University of Twenty, Enschede, The Netherlands, Nov. 27-28, 2000, 10 pages.

Deshpande et al., Development of a Low Cost Impedance Tube to Measure Acoustic Absorption and Transmission Loss of Materials, 121st ASEE Annual Conference & Exposition, Indianapolis, Indiana, USA, Jun. 15-18, 2014, 15 pages.

PAROC®, Sound Absorption, Retrieved from the Internet on Aug. 31, 2015 at URL: http://www.paroc.com/knowhow/sound/sound-absorption, 3 pages.

* cited by examiner

GEOMETRIC SOUND ABSORPTION VIA ADDITIVE MANUFACTURING

FIELD

This disclosure relates to sound damping structures and methods for manufacturing sound damping structures. More specifically, the disclosed embodiments relate to methods for additively manufacturing three-dimensional sound damping structures suitable for placement and sound absorption in a particular location, such as an interior of an aircraft, motor vehicle, or building.

BACKGROUND

For various reasons, it may be desirable to damp sound, or reduce noise, in a particular location. Conventional structures used for noise reduction include damping materials such as drywall, mass-loaded vinyl, foam sheets, end-grain balsa, etc. Such materials are not designed to absorb sound energy based on their geometric properties; rather, they damp sound based on density of the material. For example, increasing the density of a material may increase sound absorption performance. Increasing the amount of a material, such as its thickness in the direction of sound propagation, may further increase sound absorption performance. Accordingly, conventional sound damping structures may be heavy, bulky, and/or not specifically designed for sound absorption.

Further, conventional methods for manufacturing sound damping structures may be expensive and complicated, and include bonding, beveling, cutting, and/or shaping the damping materials to fit a three-dimensional space of a particular location. For instance, honeycomb panels, which are widely used in the aerospace industry to absorb sound within an aircraft, are relatively lightweight but must be adhesively bonded and machine cut to desired dimensions in order to fit in a particular space within an aircraft. Thus, it would be desirable to further reduce manufacturing costs and lead time for the production of sound damping structures.

SUMMARY

The present disclosure relates to sound damping structures and methods for additively manufacturing geometric sound damping structures. In some embodiments, the disclosed methods of manufacturing may include selecting a desired sound damping geometry, inputting a three-dimensional (3D) computer-aided design (CAD) model of the geometry into an additive manufacturing machine, and additively manufacturing a 3D sound damping structure corresponding to the computer-aided design model.

In some embodiments, the disclosed method may include determining a desired set of sound absorption properties, determining a desired sound absorbing geometry based on the sound absorption properties, constructing a 3D CAD model of the geometry, and additively manufacturing a 3D sound absorbing panel based on the CAD model. The sound absorbing panel may be used to absorb sound inside an aircraft.

In some embodiments, the disclosed method may include determining a set of sound absorption properties by measuring sound to be absorbed in an aircraft, determining a sound absorbing geometry based on the sound absorption properties, constructing a 3D CAD model of the geometry, inputting data for the CAD model into an additive manufacturing machine, and additively manufacturing a sound absorbing composite core corresponding to the geometry.

Features, functions, and advantages may be achieved independently in various embodiments of the present disclosure, or may be combined in yet other embodiments, further details of which can be seen with reference to the following description and drawings.

DESCRIPTION

Overview

Various embodiments of sound damping structures and methods for manufacturing sound damping structures are described below and illustrated in the associated drawings. Unless otherwise specified, the disclosed sound damping structures, methods and/or their various components and steps may, but are not required to, contain at least one of the structure, components, steps, functionality, and/or variations described, illustrated, and/or incorporated herein. Furthermore, the structures, components, steps, functionalities, and/or variations described, illustrated, and/or incorporated herein in connection with the present teachings may, but are not required to, be included in other similar structures or manufacturing methods. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

1. General Features

Figure 1:
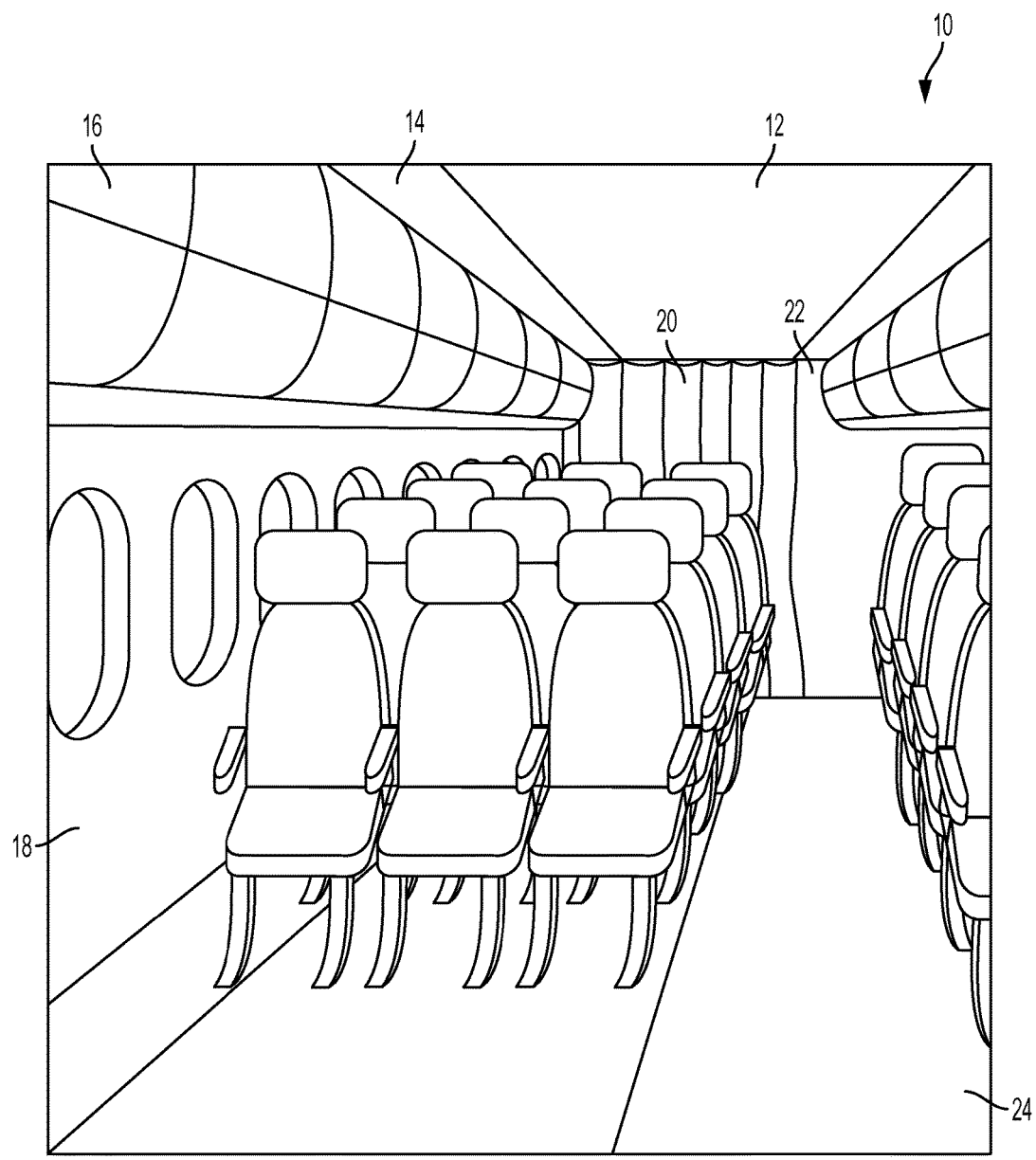
FIG. 1 is a perspective view of an interior portion of an aircraft showing locations in the aircraft where sound absorbing cores and/or panels manufactured according to embodiments of the present invention may be placed.
Figure 2:
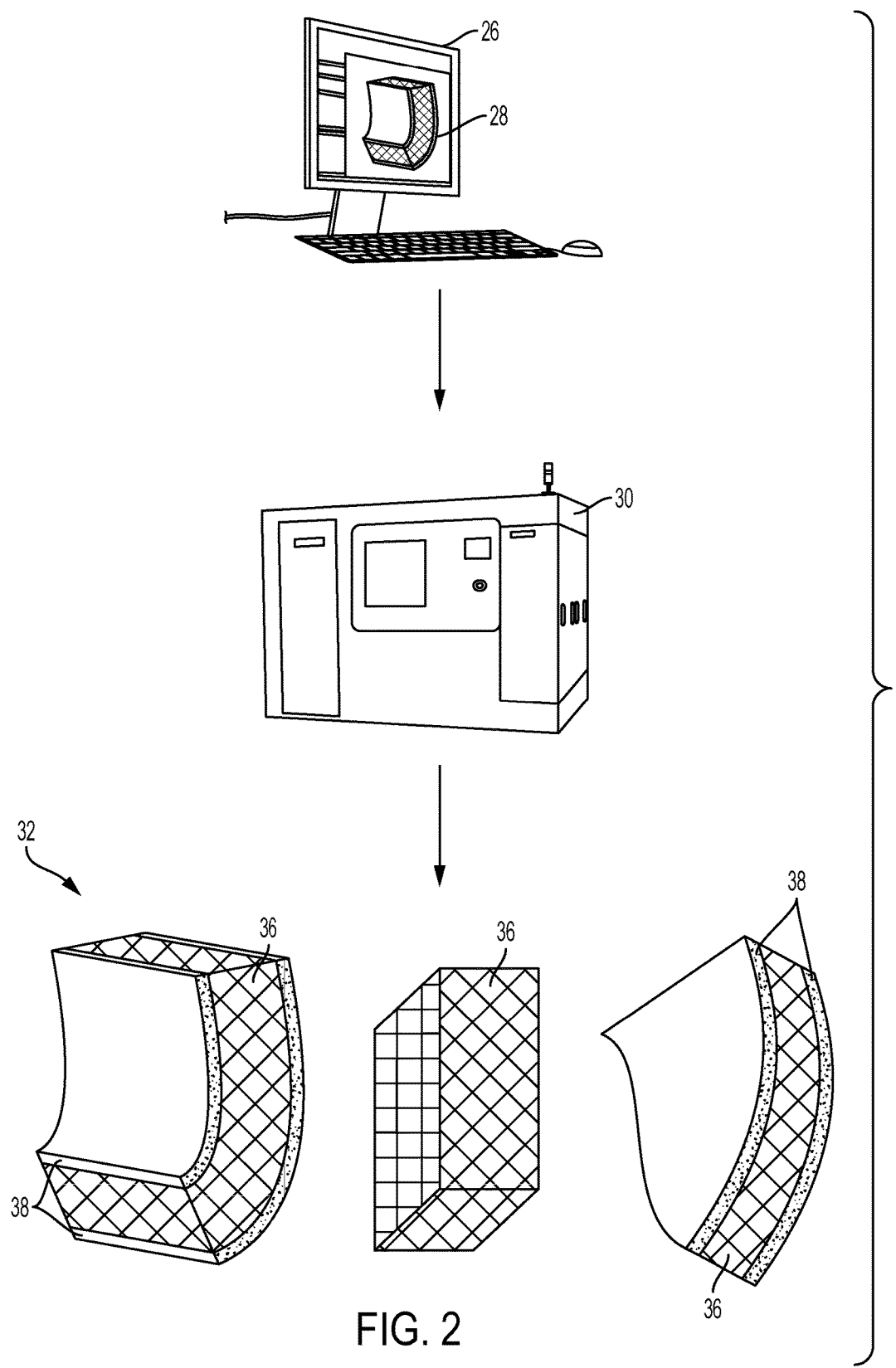
FIG. 2 is a schematic representation depicting a manufacturing method according to aspects of the present disclosure.

This section describes general features of sound damping structures and their method of manufacture according to aspects of the present teachings; see FIGS. 1-2.

As shown in FIG. 1, there may be several suitable locations within an aircraft interior, generally indicated at 10, where 3-dimensional (3D) sound damping structures such as cores and/or panels manufactured according to aspects of the present teachings may be placed. Sound damping structures may, for example lower cabin noise by damping, i.e., absorbing, reflecting, and/or otherwise attenuating noise energy generated by an aircraft component on a non-cabin facing side of the structures, and/or aerodynamic noise arising from airflow around the aircraft. The structures may also lower noise in a crew rest compartment, where pilots and flight attendants may rest or sleep during long-haul flights. For instance, the structures may be placed in a door, partition, bunk, etc. of the compartment to reduce noise in the compartment. The structures may additionally be configured to meet Federal Aviation Administration (FAA) standards for the particular location where they are to be placed.

More specifically, for example, sound damping structures according to aspects of the present teachings may be placed in ceiling(s) 12, trim 14, stow bin(s) 16, sidewall(s) 18, partition(s) 20, closet(s) 22, floor panel(s) 24, and/or any other appropriate location(s) inside an aircraft. The structures may have a generic shape, size, and/or sound damping geometry, or the structures may be custom tailored for a pre-determined location of the aircraft. Customizability of the structures may be important because different locations in the aircraft may require structures with different dimensions and/or sound damping properties.

For example, a structure that may be placed in a stow bin 16 may be substantially curved to fit a contour of stow bin 16, whereas a structure that may be placed in a floor panel 24 may be substantially flat to fit a contour of the floor. Additionally, a structure that may be placed in a sidewall 18 may be configured to damp noise that may be incident on the sidewall, e.g., aerodynamic and/or jet noise, whereas a structure that may be placed in a partition 20 may be configured to damp noise generated by an aircraft component on the non-cabin facing side of the structure, e.g., a cabin pressurization system. Moreover, FAA standards may be different for different locations in an aircraft and/or different types of aircrafts, requiring different properties of the sound damping structures.

FIG. 2 shows a schematic, high level visual representation of a manufacturing method according to aspects of the present teachings. Specifically, a computer 26 may be used for one or more steps of the manufacturing, including constructing and/or providing a 3D computer-aided design (CAD) model 28 of a sound damping geometry. Data for CAD model 28 may be input or transmitted into an additive manufacturing machine 30, such as a 3D printer. The additive manufacturing machine may then additively manufacture composite structures, generally indicated at 32, based on CAD model 28. Embodiments of sound damping composite structures are discussed in more detail in Section 2 below. Embodiments of the additive manufacturing process are discussed in more detail in Section 3 below.

As shown in FIG. 2, sound damping structures according to the present teachings may vary in shape, and may include a composite core 36 having a sound damping geometry. The crisscross pattern shown on the core 36 is merely schematic, and may not be indicative of an actual sound damping geometry. The core 36 may further be volume-filling and disposed between a set of rigid panels 38, also referred to as a "sandwich structure." The core 36 and/or rigid panels 38 may include a plurality of layers of composite materials, including but not limited to thermoplastic materials. According to some embodiments, the rigid panels 38 may be additively manufactured with the core 36, and be made of the same composite material. In other embodiments, the rigid panels 38 may be additively manufactured separately from the core 36, and may or may not be made of the same composite material. In yet other embodiments, only the core 36 may be additively manufactured. In such embodiments, the core 36 may or may not later be disposed between rigid panels or a sandwich structure.

EXAMPLES, COMPONENTS, AND ALTERNATIVES

The following sections describe selected aspects of exemplary sound damping structures and methods for manufacturing sound damping structures. The examples in these sections are intended for illustration and should not be interpreted as limiting the entire scope of the present disclosure. Each section may include one or more distinct inventions, and/or contextual or related information, function, and/or steps.

2. Sound Absorbing Structures

This section describes more specific aspects of sound absorbing structures manufactured according to aspects of the present teachings; see FIGS. 3-6B.

Example 1

Figure 3:
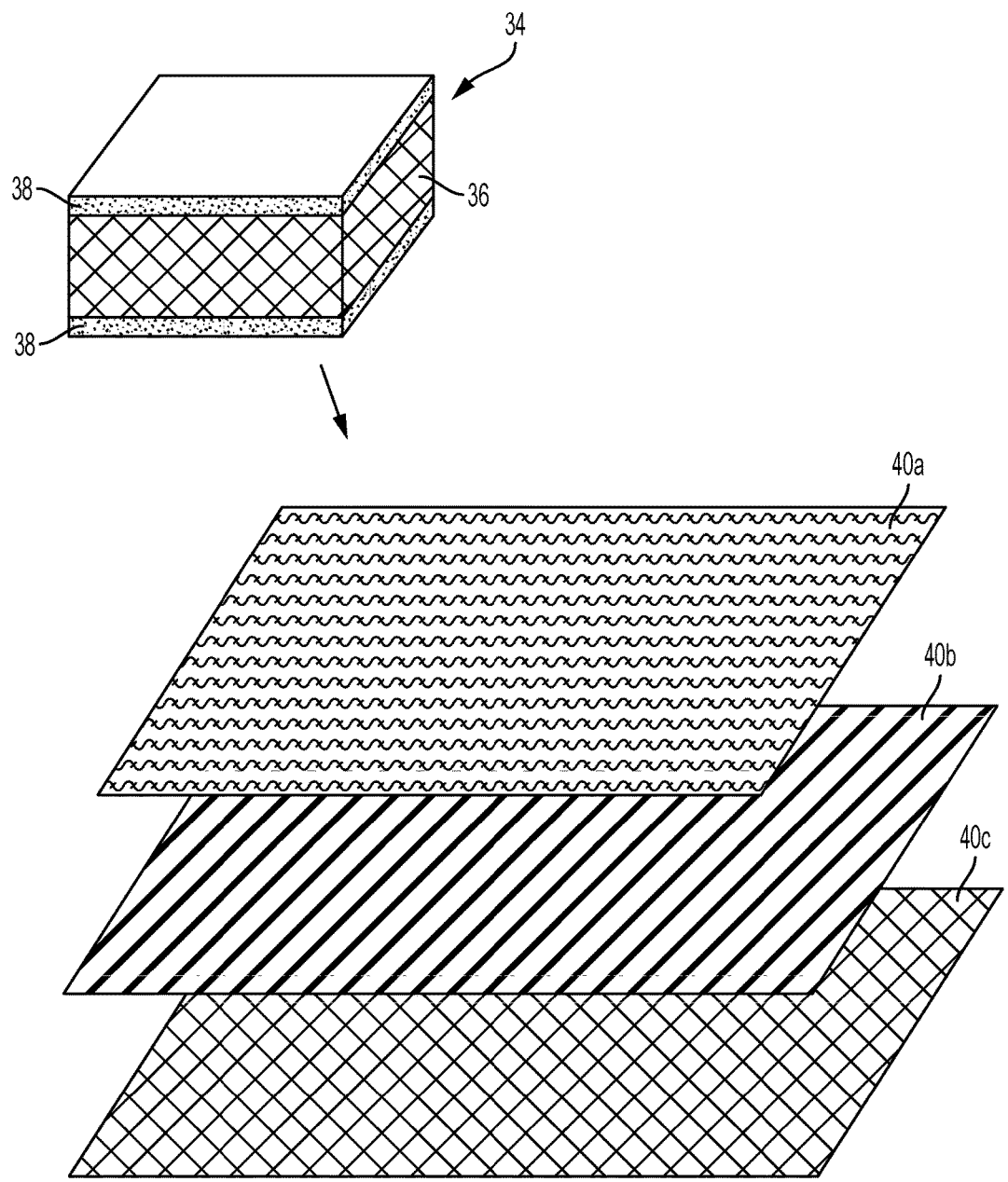
FIG. 3 is a perspective view showing slices of a sound absorbing panel manufactured according to aspects of the present disclosure.

FIG. 3 shows an example of a sound absorbing panel, generally indicated at 34, including a core 36 disposed between a pair of outer members or sandwich structure 38. A portion of core 36 is shown in an exploded view in the lower portion of FIG. 3. Geometry-based or shape-based structures may absorb and attenuate sound more efficiently than conventional, density-based techniques, and as depicted in FIG. 3, embodiments of the present invention allow for high geometric complexity.

Specifically, core 36 may vary in density and/or shape between two or more layers of the core. Three slices 40a, 40b, 40c of core 36 are shown in the lower part of FIG. 3, representing geometric variations within core 36. The patterns are merely illustrative, and may not be indicative of an actual sound absorbing geometry. In some embodiments, the sound absorbing geometry may be determined based on a desired set of sound absorbing properties. The sound absorbing properties may be determined based on mapping and/or measuring sound to be absorbed. In alternative embodiments, a known sound absorbing geometry may be selected based on its known sound absorbing properties.

Figure 4:
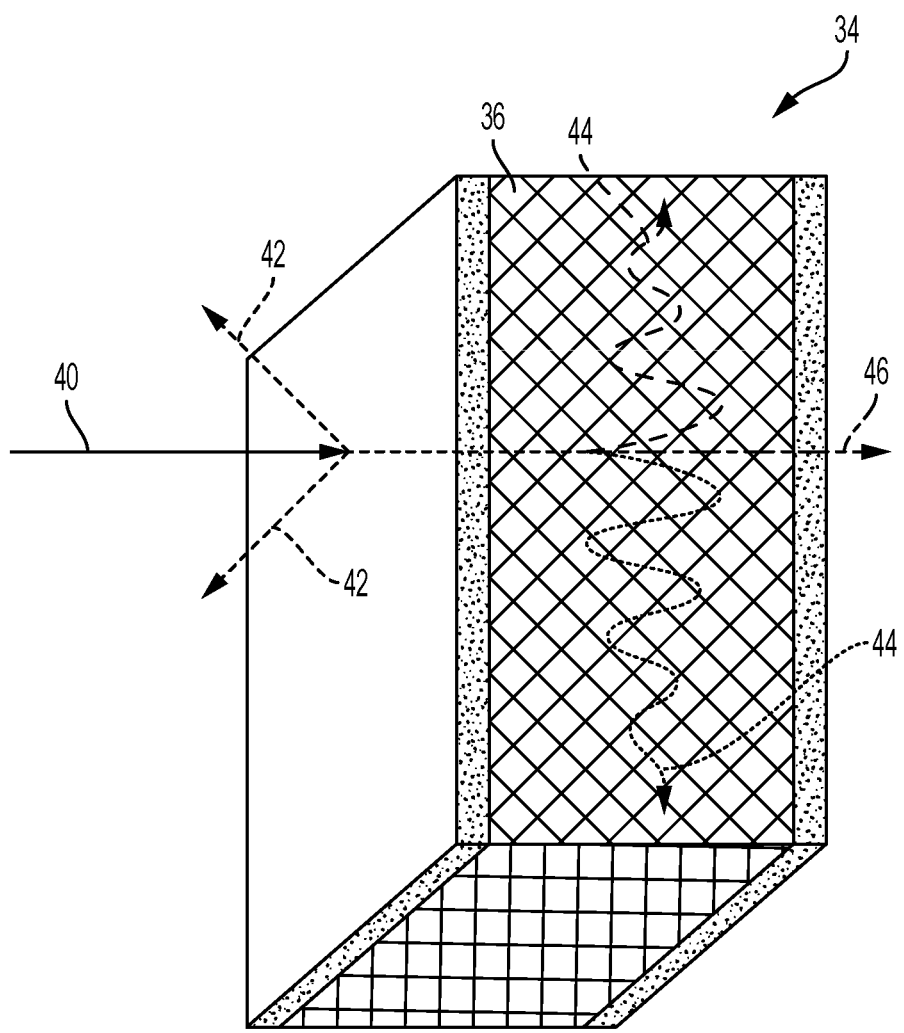
FIG. 4 is a perspective view showing a sound absorbing panel according to aspects of the present disclosure, with arrows indicating the reflection, absorption, and transmission of sound incident on the panel.

FIG. 4 shows a magnified view of sound absorbing panel 34 of FIG. 3. Arrows indicate sound 40 incident on panel 34 and being damped or redirected by panel 34. Diffused (or reflected) sound is indicated at 42, absorbed sound is indicated at 44, and transmitted sound is indicated at 46. Core 36 may be configured to have a highly reflective and/or absorptive sound damping geometry, so that transmitted sound 46 may have a much lesser amplitude (i.e. sound volume) at one or more frequencies than incident sound 40.

Example 2

Figure 5:
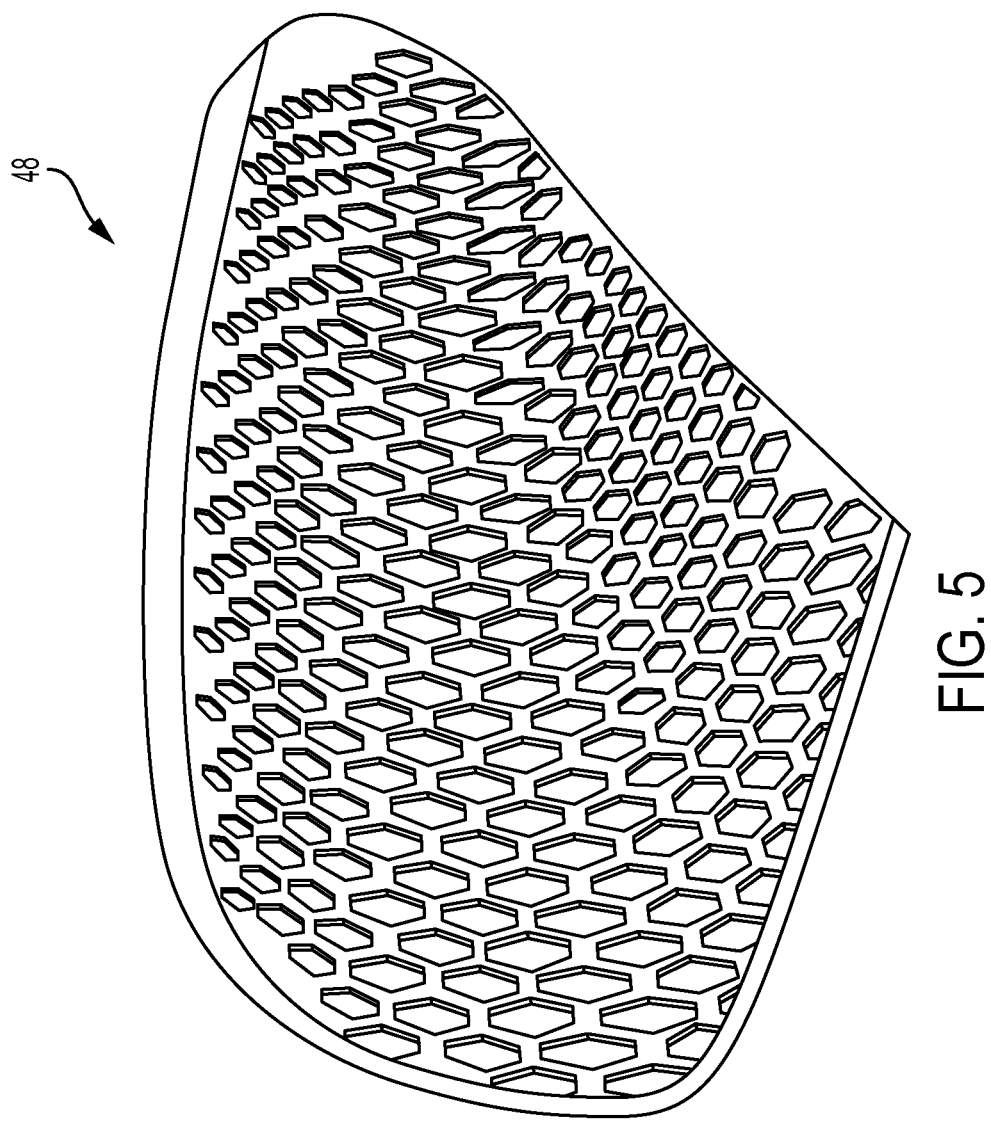
FIG. 5 is a perspective view showing a sound absorbing core manufactured according to aspects of the present disclosure.

FIG. 5 shows an example of a sound absorbing core 48 that may be manufactured according to an embodiment of the present teachings, illustrating a complex overall geometry that may be obtained through an additive manufacturing process. Core 48 may be configured with a size, shape, and/or geometry that may be appropriate for any location inside an aircraft where sound damping is desired.

Example 3

Figure 6A:
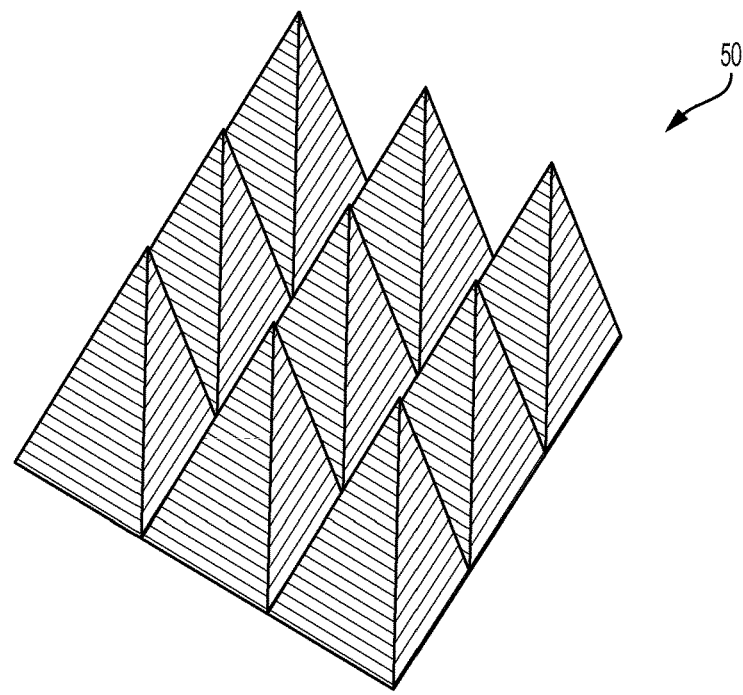
FIG. 6A is a perspective view depicting a sound damping geometry that may be manufactured according to aspects of the present disclosure.

FIG. 6A shows an example of a sound damping geometry, generally indicated at 50, which may be used in some embodiments of the present teachings. More specifically, according to the present teachings, damping geometry 50 may be created using an additive manufacturing process. Damping geometry 50 includes an array of pyramids 52, and is configured to reflect very little to no sound. Specifically, geometry 50 damps sound by repeatedly scattering and absorbing sound waves.

Figure 6B:
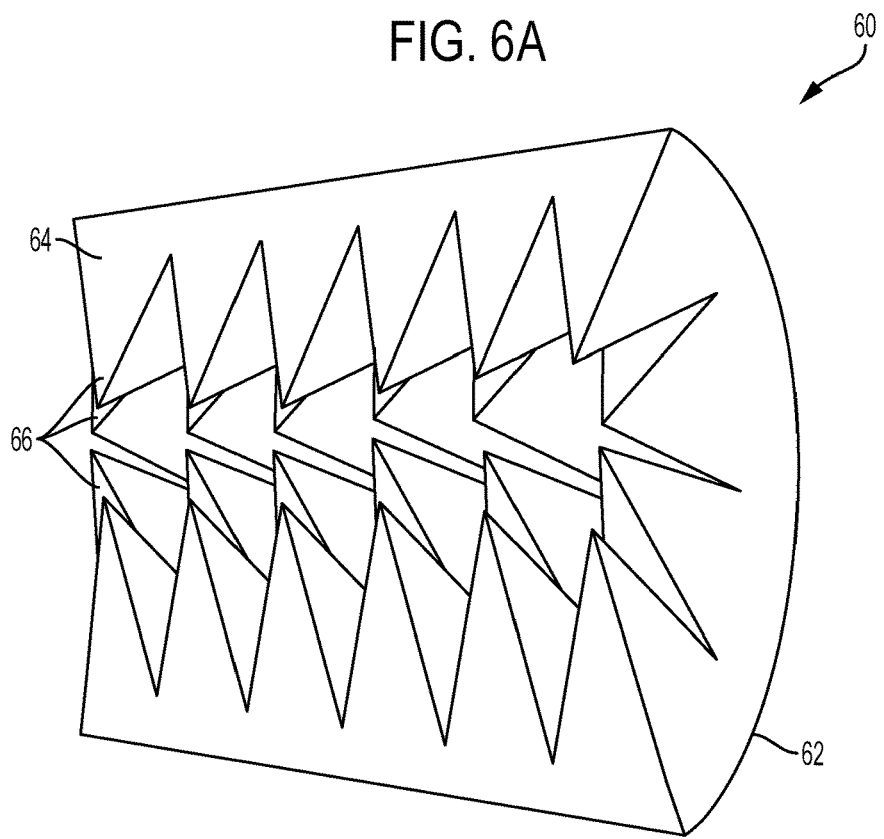
FIG. 6B is a perspective view showing the sound damping geometry of FIG. 6A incorporated into a sound damping panel that may be manufactured according to aspects of the present disclosure.

As shown in FIG. 6B, damping geometry 50 may be incorporated into a sound absorbing panel 60 having a substantially curved shape, or any other shape suitable for use in a particular location. For instance, panel 60 may be disposed in an aircraft interior with curved inner surface 62 of panel 60 facing the interior of the aircraft. In this case, irregular surface 64 including sound damping structures 66 may be hidden from view, for instance inside an aircraft wall or bulkhead. In other cases, an additional planar or curved structure may be disposed adjacent to irregular surface 64, to hide the surface from view and/or to provide additional structural integrity to panel 60.

Although an exemplary application of sound damping structures incorporating the present teachings may be for use in aircraft interiors, sound damping structures incorporating aspects of the present teachings, particularly additive manufacturing methods, also may be used in motor vehicles, acoustic test chambers, concert halls, residential buildings, and/or any other location where sound damping may be desired. In such applications, as in aircraft applications, any suitable damping geometry may be used.

3. Manufacturing Methods

Figure 7:
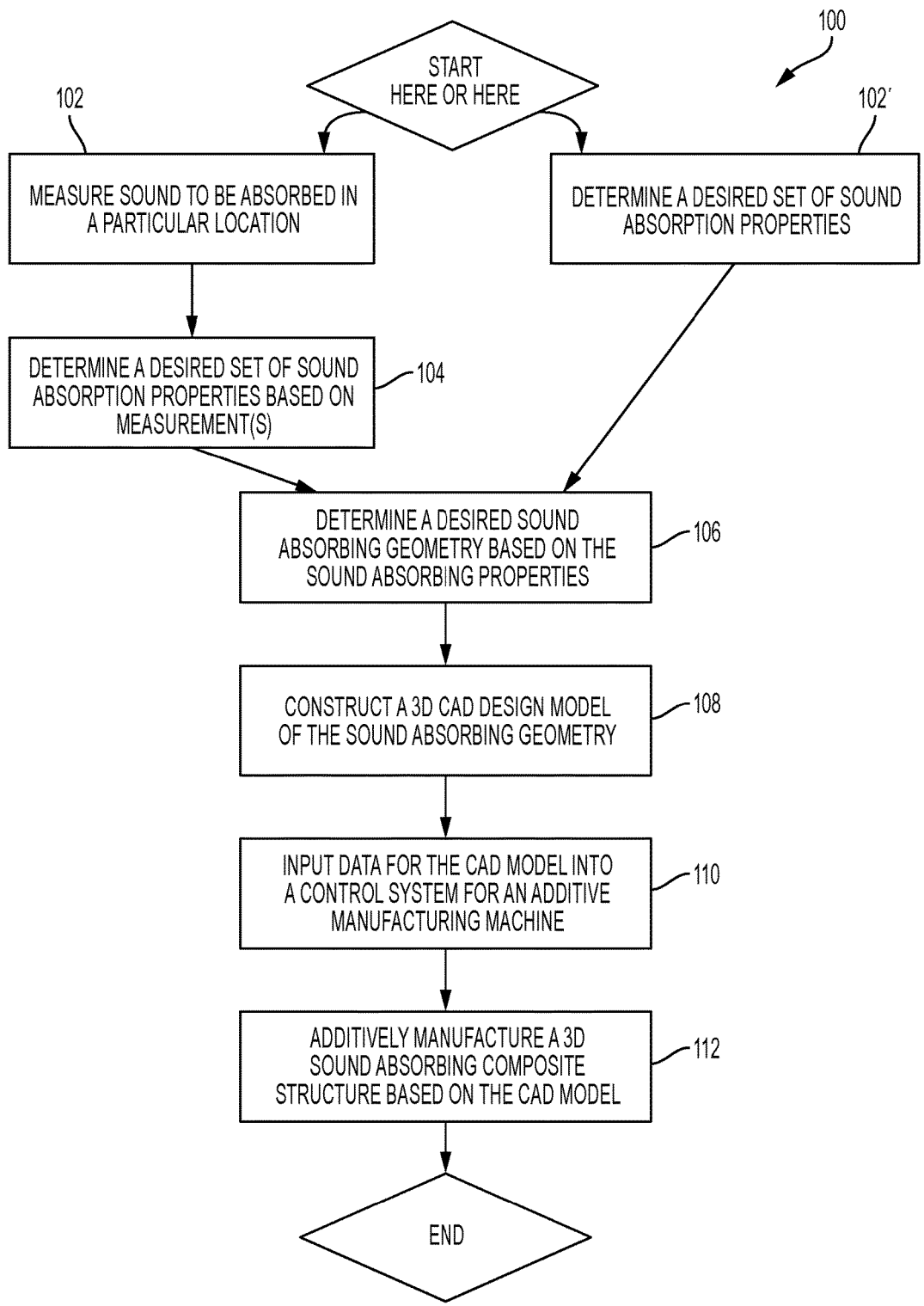
FIG. 7 is a flowchart depicting methods of manufacturing sound absorbing structures, according to aspects of the present disclosure.
Figure 8:
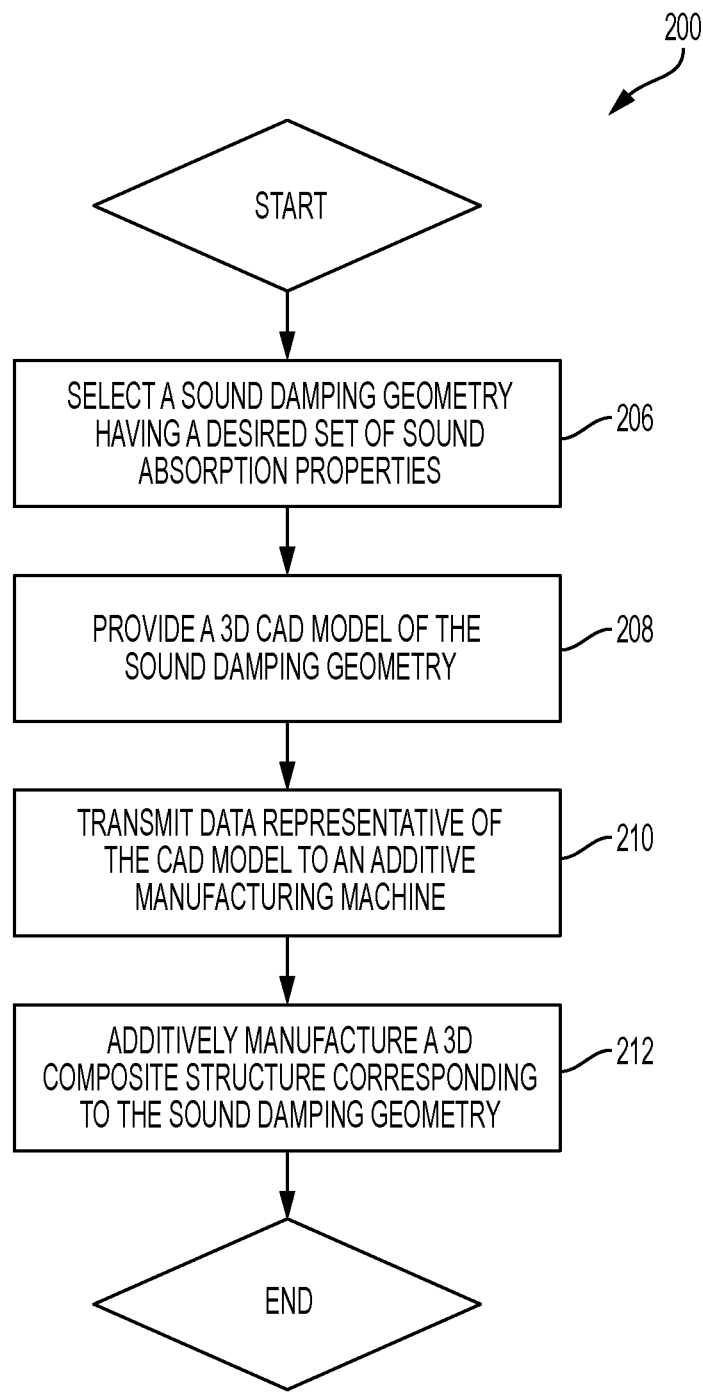
FIG. 8 is flowchart depicting another method of manufacturing sound absorbing structures, according to aspects of the present disclosure.

This section describes methods of additively manufacturing sound damping structures according to aspects of the present teachings; see FIGS. 7-8.

Example 4

FIG. 7 is a flow chart depicting exemplary methods of manufacturing sound damping structures, generally indicated at 100, according to aspects of the present teachings.

Specifically, in some embodiments, a first step 102 of method 100 may be to measure sound to be absorbed in a particular location. Suitable locations may include the interior of an aircraft, motor vehicle, acoustic test chamber, and/or any other location where sound damping may be desired. The sound may be measured using any suitable sound measuring device, such as an audio analyzer, a sound level meter, or a microphone configured to capture and transmit sound to a device that can analyze the sound using a sound measurement software application. In some cases, a smart phone having a built-in microphone and running a sound measurement application might be suitable. Measurements of the sound may include, for example, sound amplitude as a function of sound frequency, time, and/or three-dimensional position within the space through which the sound propagates. The measurements may also enable a user to determine a sound absorption coefficient in a step 104 of method 100, discussed below.

A second step 104 of method 100 may be to determine a desired set of sound absorption properties based on measurements taken of the sound in step 102. Determining sound absorption properties based on sound measurements allows for the manufacture of highly customized sound absorbing structures, i.e., with sound absorbing properties specifically tailored to match the sound conditions where each structure will be placed. An example of a sound absorption property may be a sound absorption coefficient of a material as a function of sound frequency and three-dimensional position, based on sound amplitudes measured during step 102.

More specifically, when sound is incident on a material, some of the incident sound may be reflected, whereas remaining sound may pass into the material and either be transmitted through or absorbed (i.e., dissipated) by the material. The sound absorption coefficient is the fraction of incident sound intensity absorbed by the material, and can be expressed as follows, where α is the sound absorption coefficient, $I_a$ is the sound intensity absorbed, and $I_i$ is the incident sound intensity:

$$\alpha = \frac{I_a}{I_i}$$

Using the above equation and based on measurements of sound taken in step 102, a user may determine a minimum sound absorption coefficient that is required to reduce sound in a particular location to a desired level. For example, in some embodiments, measurements taken in step 102 may yield the amplitude of particular frequencies of sound in various locations. A user may then determine an amount by which to reduce the amplitude of the sound, i.e., an amount of sound that must be absorbed to reach a desired sound intensity. The desired sound intensity may be a maximum amount of noise that is acceptable to the user in the particular location, and may be based on factors such as user preference and/or FAA safety standards.

More specifically, the desired sound intensity is the difference between the incident sound intensity and the absorbed sound intensity, and can be expressed as follows, where $I_d$ is the desired sound intensity, $I_i$ is the incident sound intensity, and $I_a$ is the sound intensity absorbed:

$$I_d = I_i - I_a = I_i(1-\alpha)$$

Accordingly, the minimum sound absorption coefficient ($\alpha_{min}$) can be expressed in terms of the incident sound intensity and the maximum acceptable sound intensity (i.e., the desired sound intensity) as follows:

$$\alpha_{min} = 1 - \frac{I_d}{I_i}$$

In this manner, the user may calculate the minimum sound absorption coefficient required for the desired level of sound absorption in each particular location where sound is to be absorbed.

In other cases, method 100 may not include the measuring of sound, in which case a first step 102' of method 100 may be to determine a desired set of sound absorption properties by some method other than through sound measurements. In some cases, the sound absorption properties may be determined based on the type(s) of sound known to propagate in a particular location. For example, it may be known that aerodynamic noise may be incident on sidewalls of an aircraft. Correspondingly, structures configured to be placed inside and/or adjacent to the sidewalls may be provided with a set of properties (e.g., a sound absorption coefficient)

suitable for absorbing aerodynamic noise. Similarly, structures configured to be placed in other locations may be provided with other sound absorption properties that match the type of sound expected at each location. In other cases, structures may be manufactured with general sound absorption properties that may not be specific for use in a particular location.

Whether or not sound absorption properties are determined based on sound measurements, after determining the desired sound absorption properties, such as a sound absorption coefficient, a next step 106 of method 100 may be to determine (i.e., create or select) a desired sound absorbing geometry based on the sound absorption properties. The sound absorbing geometry may have any desired degree of complexity, as discussed above. Additionally, for embodiments in which a particular location may be pre-determined, the geometry may be custom tailored to absorb sound in the pre-determined location, to fit within the location, and/or to meet FAA safety requirements.

Specifically, a desired sound absorbing geometry may be determined based on the minimum sound absorption coefficient determined in step 104 or step 102' of method 100, discussed above. For example, a user may determine the sound absorption coefficient of a particular geometry of a material, and then compare the sound absorption coefficient of the geometry to the minimum sound absorption coefficient determined in step 104 or step 102'. If the sound absorption coefficient of the geometry is equal to or greater than the minimum sound absorption coefficient, the geometry may be suitable for sound absorption in the location. However, if the sound absorption coefficient of the geometry is less than the minimum sound absorption coefficient, the user may select a different geometry having a more suitable sound absorption coefficient. An experienced user may be able to accurately predict various sound absorbing structures that will provide the required sound absorption coefficient.

In some cases, a user may determine a previously unknown sound absorption coefficient of a particular geometry by measuring the sound absorption properties of a material having that geometry. Suitable methods for measuring the sound absorption properties of a material include reverberation room methods and/or impedance tube methods, both of which are well known. See, for example, *Development of a Low Cost Impedance Tube to Measure Acoustic Absorption and Transmission Loss of Materials*, S. Deshpande and M. Rao, 121st American Society for Engineering Education Conference & Exposition (Indianapolis, Ind., Jun. 15-18, 2014), Paper ID #8776, which is hereby incorporated by reference. However, the user may use any suitable method for measuring the sound absorption coefficient of a material. Sound measurements may include incident sound intensity ($I_i$) and sound intensity absorbed ($I_a$), from which the sound absorption coefficient ($\alpha$) of the geometry may be calculated as described above.

In other cases, sound absorption coefficients of certain materials having particular geometries may already be known, and thus a user may not need to measure the sound absorption properties of the materials. For example, sound absorption coefficients may be available for each geometry in a set of known geometries, for example in a database or "library" of sound absorbing geometries. A user may then select a particular geometry based on required parameters such as weight, stiffness, etc., and then use the known sound absorption coefficient data to verify whether the sound absorption coefficient of the particular geometry is suitable, i.e., greater than or equal to the minimum sound absorption coefficient determined in step 104 or 102'. If the sound absorption coefficient is suitable, then the user may select the geometry having that sound absorption coefficient. However, if the sound absorption coefficient is not suitable, the user may select a different geometry having the desired sound absorption coefficient.

Alternatively, in some cases, the user may enter properties such as stiffness, dimensions, and/or a minimum sound absorption coefficient into a database search dialog, and search for geometries having the desired properties, including a sound absorption coefficient at least equal to the desired minimum. For situations in which no precise minimum sound absorption coefficient is predetermined, the geometry may be a sound absorbing geometry with known sound absorption properties, such as the pyramidal geometry shown in FIGS. 6A-6B, while the overall thickness and other dimensions of the sound absorbing structure may be determined by other requirements such as structural requirements.

In yet other cases, instead of selecting a known geometry, a user may create a geometry based having the desired set of sound absorbing properties determined in step 104 or 102' of method 100. For example, the user may modify a known geometry, combine aspects of known geometries to create a new geometry, create an entirely new geometry, and/or experiment by trial and error to achieve desired sound damping results. In such cases, the user may determine the sound absorption coefficient of the user-created geometry by any suitable methods of measuring sound absorption properties, such as the reverberation room method and the impedance tube methods discussed above. The user then may compare the sound absorption coefficient of the geometry to the minimum sound absorption coefficient determined in step 104 or 102', to determine whether the user-created geometry has suitable sound absorption properties. If the geometry is suitable, the user may select the geometry. However, if the geometry is not suitable, the user may modify the geometry to have the desired sound absorption properties, create a different geometry, select a different geometry, etc. In other words, the user may determine a desired sound absorbing geometry by any suitable method or combination of methods.

After a desired sound absorbing geometry has been determined, a subsequent step 108 of method 100 is to construct a 3D CAD model of the sound absorbing geometry. To accomplish this, a user will typically use a computer software application to transform the desired sound absorbing geometry into a CAD model. In some cases, portions of the CAD model may already be available for use, such as in a library of known or previously modeled sound damping geometries. However, such known geometries may typically be incorporated into a unique shape configured to meet the requirements of each specific application. For example, a sound damping structure may have a certain curvature to fit a particular location, and/or a certain thickness to achieve a desired level of sound damping in the particular location. Alternatively, the sound damping structure may be configured to have a generic shape suitable for a variety of non-specific locations, such as a substantially flat panel that may be used within walls, floors, ceilings, etc.

At step 110 of method 100, data for the CAD model is input into a control system for an additive manufacturing machine, such as a 3D printer. For instance, the structure may be manufactured using additive manufacturing techniques such as fused deposition modeling (FDM), stereolithography (SLA), selective laser sintering (SLS), and/or any other suitable additive manufacturing technique. Each of these techniques may have certain advantages. For instance, SLA may produce parts with a high degree of accuracy and a high quality surface finish. SLS may produce parts using a very tough material. FDM may have the highest build volume and/or use the highest temperature materials. Accordingly, the present teachings contemplate using different additive manufacturing techniques for different applications.

A final step 112 of method 100 is to additively manufacture a 3D sound absorbing composite structure based on the CAD model, using the selected additive manufacturing technique. As discussed above, the resulting structure may include a core having a plurality of layers of composite material, and may or may not be disposed between a set of rigid panels in a sandwich configuration. Examples of composite materials that may be used to additively manufacture sound-absorbing structures include thermoplastic materials, thermoset materials, metals, polyamides, epoxy resins, photopolymers, and/or any other suitable material.

Example 5

FIG. 8 is a flow chart depicting another example of a method, generally indicated at 200, of manufacturing a 3D sound damping structure according to aspects of the present teachings. One distinction between method 200 of FIG. 8 and method 100 of FIG. 7 is that method 200 may not require any measurement(s) of sound and/or construction of a 3D CAD model.

Specifically, a first step 206 of method 200 may be to select a known sound damping geometry having a desired set of sound absorption properties. For example, the geometry may be selected from a catalog or database of known sound damping geometries. A second step 208 of method 200 may be to provide a 3D CAD model of the sound damping geometry. The CAD model may be constructed based on the selected sound damping geometry. Alternatively, the CAD model may be pre-constructed and simply selected from a set of available CAD models. A third step 210 of method 200 may be to transmit data representative of the CAD model to an additive manufacturing machine, such as a 3D printer. A final step 212 of method 200 may be to additively manufacture a 3D composite structure corresponding to the sound damping geometry. The resulting structure and the additive manufacturing techniques used to generate it may be substantially similar to the corresponding aspects of method 100, as described above and depicted in FIG. 7.

Example 7

This section describes additional aspects and features of methods for manufacturing sound damping structures, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method for manufacturing a sound absorbing panel for an interior of an aircraft, comprising: determining a desired set of sound absorption properties; determining a desired sound absorbing geometry based on the sound absorption properties; constructing a three-dimensional computer-aided design model of the sound absorbing geometry; and additively manufacturing a three-dimensional sound absorbing panel based on the three-dimensional computer-aided design model.

A1. The method of paragraph A0, wherein the panel includes a volume-filling composite core having a plurality of layers of composite material and disposed between a composite sandwich structure.

A2. The method of paragraph A1, wherein the composite material is thermoplastic.

A3. The method of paragraph A1, wherein the panel is configured to be geometrically complex, varying in at least one of density and shape between two or more layers of the panel.

A4. The method of paragraph A0, wherein the panel is configured to be placed in a pre-determined location within the interior of the aircraft.

A5. The method of paragraph A4, wherein the panel is manufactured to have a predetermined sound absorption coefficient as a function of sound frequency and three-dimensional position.

A6. The method of paragraph A0, wherein the panel is manufactured using fused deposition modeling technology.

B0. A method for manufacturing a sound absorbing core, comprising: determining a set of desired sound absorption properties by measuring sound to be absorbed in a particular portion of an aircraft interior; determining a sound absorbing geometry based on the sound absorption properties; constructing a three-dimensional computer-aided design model of the sound absorbing geometry; inputting data for the computer-aided design model into a control system for an additive manufacturing machine; and additively manufacturing a three-dimensional composite core including a plurality of layers of composite material corresponding to the sound absorbing geometry.

B1. The method of paragraph B0, wherein the core is disposed between a pair of rigid panels.

B2. The method of paragraph B1, wherein the rigid panels are additively manufactured.

B3. The method of paragraph B0, wherein the composite material is thermoplastic.

B4. The method of paragraph B0, wherein the core is configured to be geometrically complex, varying in at least one of density and shape between two or more layers of the core.

B5. The method of paragraph B0, wherein the core is configured to have a desired sound absorption coefficient as a function of sound frequency and three-dimensional position.

B6. The method of paragraph B0, wherein the core is manufactured using fused deposition modeling technology.

C0. A method for manufacturing a sound damping core, comprising: providing a three-dimensional computer-aided design model of a desired sound damping geometry; transmitting data representative of the computer-aided design model to an additive manufacturing machine; and additively manufacturing a three-dimensional composite core corresponding to the computer-aided design model.

C1. The method of paragraph C0, further comprising selecting the sound damping geometry based on a desired set of sound absorption properties.

C2. The method of paragraph C1, wherein the sound damping geometry is selected based on data obtained by mapping or measuring sound to be damped.

C3. The method of paragraph C0, wherein the core includes variations of at least one of density and shape within the core.

C4. The method of paragraph C0, wherein the core is configured to be placed in a pre-determined location within an aircraft interior.

C5. The method of paragraph C4, wherein the core is configured to damp at least one frequency of sound characteristic of the pre-determined location.

ADVANTAGES, FEATURES, BENEFITS

The different embodiments of the sound damping structures and methods for manufacturing sound damping structures described herein provide several advantages over previous structures and methods for manufacturing sound absorbing structures suitable for absorbing sound in a particular location. For example, the illustrative embodiments described herein allow for sound absorption structures which are custom tailored to fit a three-dimensional space in a particular location. Additionally, and among other benefits, illustrative embodiments described herein allow for design of sound damping structures capable of absorbing known and specific frequencies of sound. No known methods can produce structures having these functions, particularly in the aerospace industry, where different locations in an aircraft may need to comply with different FAA regulations. Thus, the illustrative embodiments described herein are particularly useful for sound absorption custom tailored to fit in a pre-determined location and absorb specific types of sound. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A method for manufacturing a sound absorbing panel for an interior of an aircraft, comprising:
   determining a desired set of sound absorption properties by measuring sound absorption properties in a particular location of an aircraft;
   determining a desired sound absorbing geometry based on the sound absorption properties;
   constructing a three-dimensional computer-aided design model of the sound absorbing geometry; and
   additively manufacturing a three-dimensional sound absorbing panel based on the three-dimensional computer-aided design model.

2. The method of claim 1, wherein the panel includes a volume-filling composite core having a plurality of layers of composite material and disposed between a composite sandwich structure.

3. The method of claim 2, wherein the composite material is thermoplastic.

4. The method of claim 2, wherein the panel is configured to be geometrically complex, varying in at least one of density and shape between two or more layers of the panel.

5. The method of claim 1, wherein the panel is configured to be placed in a pre-determined location within the interior of the aircraft.

6. The method of claim 5, wherein the panel is manufactured to have a predetermined sound absorption coefficient as a function of sound frequency and three-dimensional position.

7. The method of claim 1, wherein the panel is manufactured using fused deposition modeling technology.

8. A method for manufacturing a sound absorbing core, comprising:
   determining a set of desired sound absorption properties by measuring sound to be absorbed in a particular portion of an aircraft interior;
   determining a sound absorbing geometry based on the sound absorption properties;
   constructing a three-dimensional computer-aided design model of the sound absorbing geometry;
   inputting data for the computer-aided design model into a control system for an additive manufacturing machine; and
   additively manufacturing a three-dimensional composite core including a plurality of layers of composite material corresponding to the sound absorbing geometry.

9. The method of claim 8, wherein the core is disposed between a pair of rigid panels.

10. The method of claim 9, wherein the rigid panels are additively manufactured.

11. The method of claim 8, wherein the composite material is thermoplastic.

12. The method of claim 8, wherein the core is configured to be geometrically complex, varying in at least one of density and shape between two or more layers of the core.

13. The method of claim 8, wherein the core is configured to have a desired sound absorption coefficient as a function of sound frequency and three-dimensional position.

14. The method of claim 8, wherein the core is manufactured using fused deposition modeling technology.

15. A method for manufacturing a sound damping core, comprising:
   measuring sound absorption properties in a particular location of an aircraft;
   determining a desired sound absorption geometry based on the measuring step;
   providing a three-dimensional computer-aided design model of a desired sound damping geometry;
   transmitting data representative of the computer-aided design model to an additive manufacturing machine; and
   additively manufacturing a three-dimensional composite core corresponding to the computer-aided design model.

16. The method of claim 15, further comprising selecting the sound damping geometry based on a desired set of sound absorption properties.

17. The method of claim 16, wherein the sound damping geometry is selected based on data obtained by measuring sound to be damped as a function of position within the aircraft.

18. The method of claim 15, wherein the core includes variations of at least one of density and shape within the core.

19. The method of claim 15, wherein the core is configured to be placed in a pre-determined location within an aircraft interior.

20. The method of claim 19, wherein the core is configured to damp at least one frequency of sound characteristic of the pre-determined location.

\* \* \* \* \*